United States Patent [19]

Kojima

[11] Patent Number: 4,756,023
[45] Date of Patent: Jul. 5, 1988

[54] DIVERSITY RECEPTION RADIO RECEIVER

[75] Inventor: Tatsuru Kojima, Tokyo, Japan

[73] Assignee: NEC Corporation, Japan

[21] Appl. No.: 886,021

[22] Filed: Jul. 16, 1986

[30] Foreign Application Priority Data

Jul. 22, 1985 [JP] Japan .................. 60-162734

[51] Int. Cl.$^4$ .............................................. H04B 7/08
[52] U.S. Cl. .................................... 455/134; 455/132;
455/133; 455/136; 455/177
[58] Field of Search ................. 455/132–136,
455/276, 277; 375/100

[56] References Cited

U.S. PATENT DOCUMENTS

| 4,035,728 | 7/1977 | Ishikawa et al. | 455/134 |
| 4,450,585 | 5/1984 | Bell | 455/135 |
| 4,578,819 | 3/1986 | Shimizer | 455/135 |

FOREIGN PATENT DOCUMENTS

| 69512 | 6/1977 | Japan | 455/134 |

OTHER PUBLICATIONS

K. Suwa et al., Diversity Improvement of Voice Signal Transmission Using Postdetection Selection Combining in Land Mobile Radio, Aug. 1984, IEEE Transactions on Vehicular Technology, vol. VT-33, No. 3, pp. 134–143.

W. C. Jakes, Jr. et al., Fundamentals of Diversity Systems, Chpt. 5, pp. 309–321 of the book, Microwave Mobile Communications, W. C. Jakes, Jr. editor, John Wiley & Sons, Inc. (N.Y., 1974).

*Primary Examiner*—Michael A. Masinick
*Attorney, Agent, or Firm*—Laff, Whitesel, Conte & Saret

[57] ABSTRACT

A diversity reception radio receiver has a two-receiver system incorporating first and second receivers. A wave envelope detector is provided for each receiver to generate an output voltage corresponding to the strength of the electromagnetic signal wave which is picked up by the receiver. A hysteresis comparator compares the outputs of the two wave envelope detectors and generates a switching control signal. A switching device responds to the switching control signal by selecting between the signals which are reproduced by the first and second receivers. Because the amount of hysteresis in the comparator is automatically adjusted in accord with the strength of the signal wave, there is a minimum of hunting between the outputs of the two receivers.

12 Claims, 4 Drawing Sheets

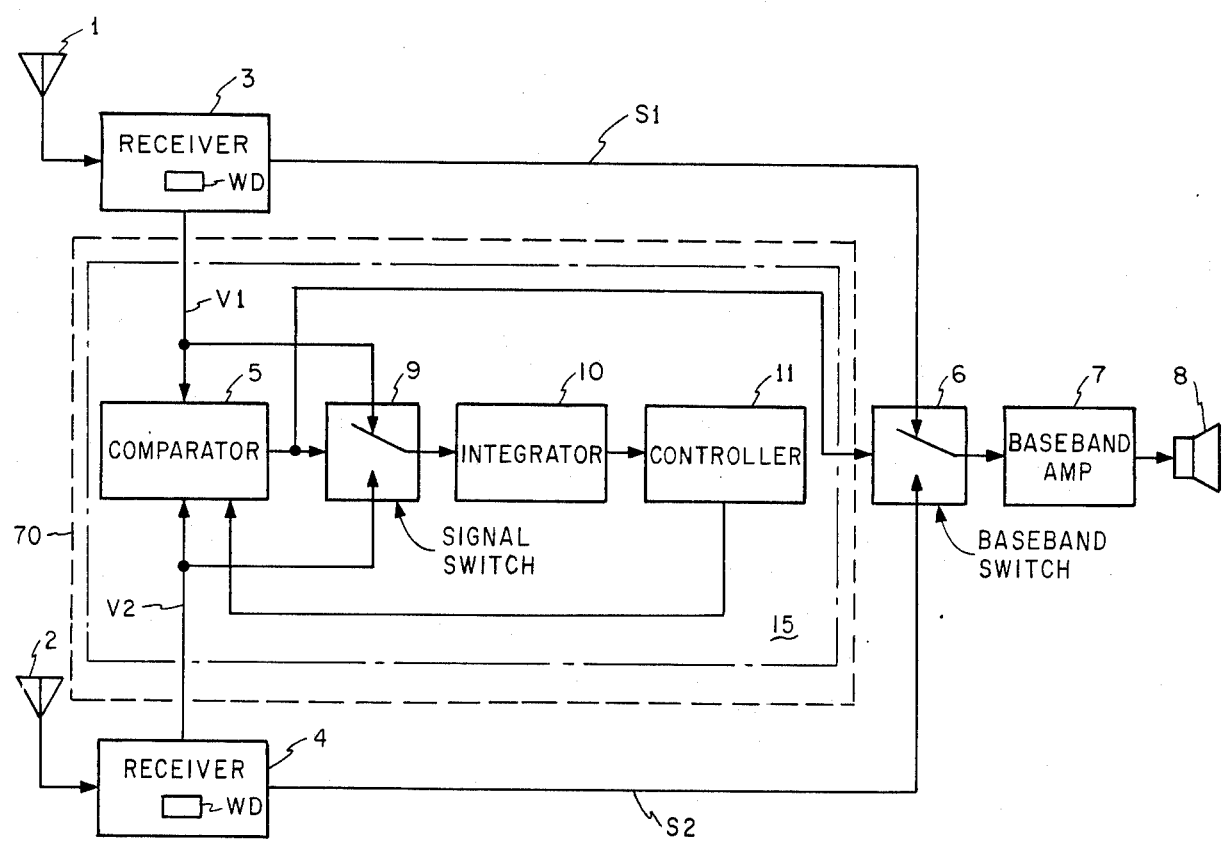
FIG. 1
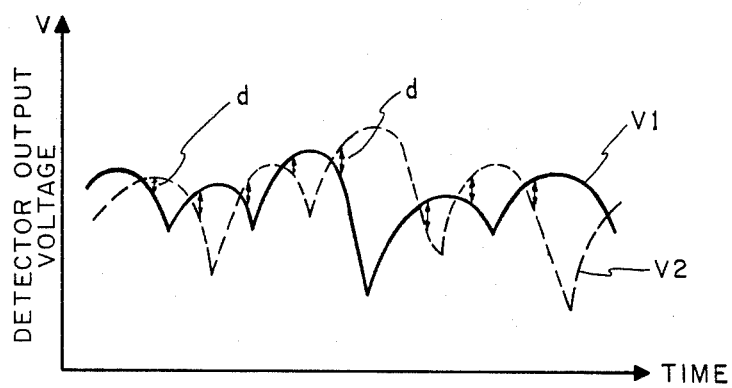
FIG. 2
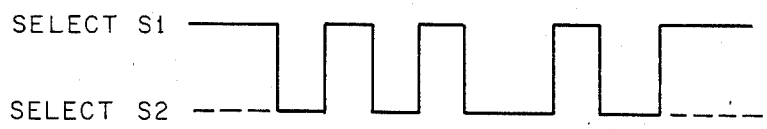
RECEIVER SWITCHING FOR WEAK SIGNAL WAVES

RECEIVER SWITCHING FOR STRONG SIGNAL WAVES

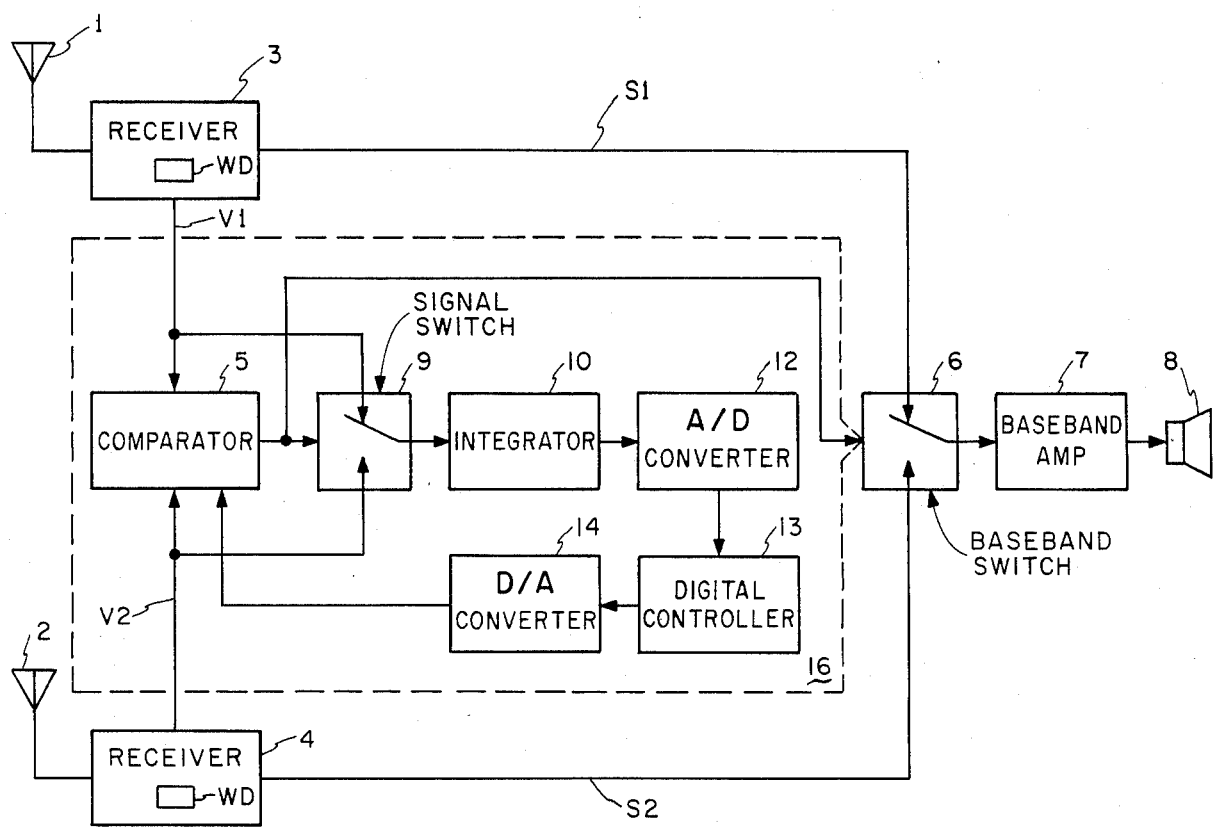
FIG. 6
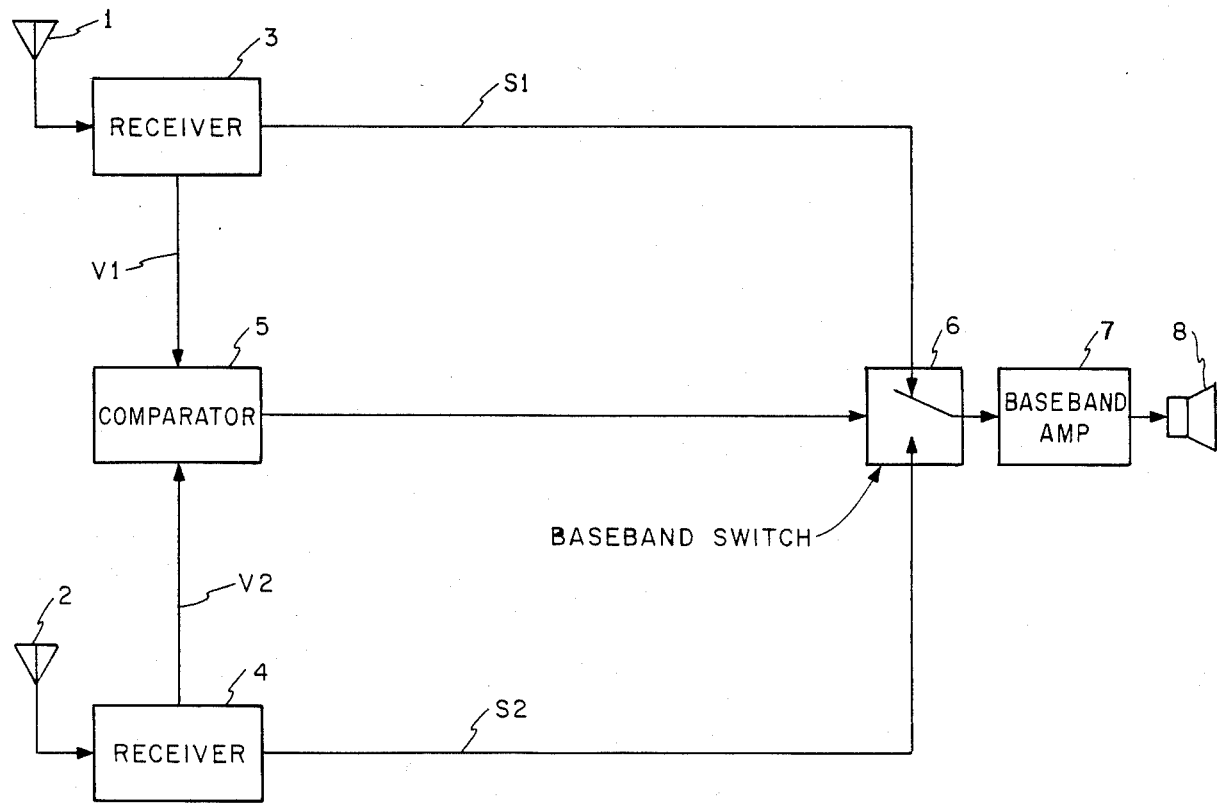
PRIOR ART  FIG. 7

DIVERSITY RECEPTION RADIO RECEIVER

This invention relates to the field of wireless receivers for mobile communications. More particularly, it relates to a radio receiver system employing diversity switching to automatically select among the outputs of a plurality of receivers, such as twin receivers, and to improve communication quality when the strengths of the electromagnetic signal waves reaching the receiver system are subject to large scale fluctuations.

An object of the invention is to provide a diversity reception receiver that reduces unwanted switching noise in a recovered signal when both signals waves are weak or strong. A more particular object of the invention is to reduce the unnecessary "churning" of prior art diversity receivers when both signals are relatively weak and the unnecessary switching that saturates the signal-to-noise (S/N) performance when both signals are relatively strong.

In keeping with an aspect of the invention, a diversity reception radio receiver has a two-receiver system incorporating first and second receivers. A wave envelope detector is provided for each receiver to generate an output voltage corresponding to the strength of the electromagnetic signal wave which is picked up by the receiver. A hysteresis comparator compares the outputs of the two wave envelope detectors and generates a switching control signal. Responsive to the switching control signal, a switching means selects between the signals which are produced by the first and second receivers. The amount of hysteresis in the comparator is adjustable so that there is a minimum of or no hunting between the output of the two receivers.

The above mentioned and other features of this invention and the manner of obtaining them will become more apparent, and the invention itself will be best understood by reference to the following description of some embodiments of the invention taken in conjunction with the accompanying drawings, in which:

FIG. 1 is a simplified diagrammatic block diagram of a first embodiment of my invention;

FIG. 2 shows typical detector output voltages of weak signal waves from the two receivers which are used in the embodiment of FIG. 1, together with a trace indicating which receiver output will be selected by automatic switching;

FIG. 6 is a simplified diagrammatic block diagram of a second embodiment of my invention employing a digital controller; and FIG. 7 is a block diagram of a prior art diversity receiver employing automatic switching between two receivers.

Figure 3:
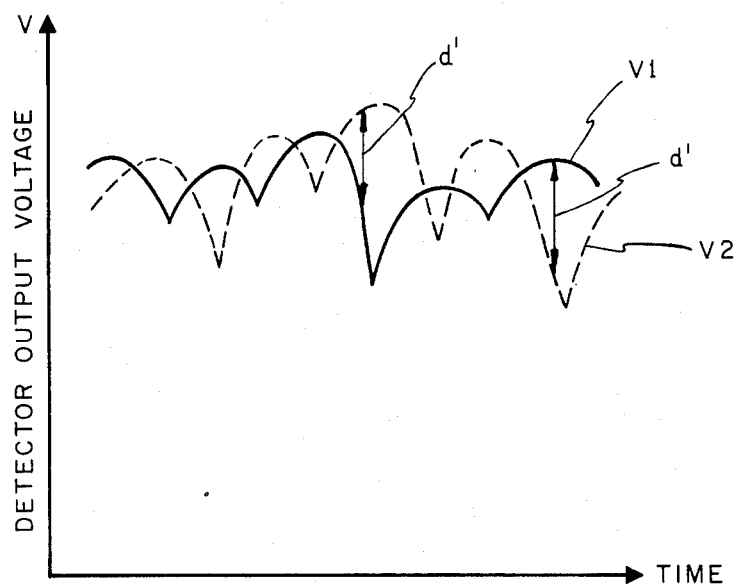
FIG. 3 shows typical detector output voltages of strong signal waves from the two receivers which are used in the embodiment of FIG. 1, together with a trace indicating which receiver output will be selected by automatic switching.

The block diagram of FIG. 7 shows a prior art diversity reception receiver for frequency modulated (FM) signals. The FM modulated signals are picked up by a separated pair of antennas 1 and 2 and are respectively input to a pair of demodulating receivers 3 and 4, which in turn recover baseband signals S1 and S2 from the picked up modulated signals.

For determining the received signal strength, each receiver includes a wave envelope detector (not shown) for detecting the wave envelope of the antenna signals which it receives. These wave envelope detectors respectively generate detector output voltages $v_1$ (receiver 3) and $v_2$ (receiver 4) which are proportional to the strengths of the electromagnetic waves picked up from their respective antennas 1, 2.

These detector output voltages $v_1$, $v_2$ are input to a comparator 5 which generates a signal for directing baseband switch 6 to select the output of the baseband receiver having the larger detector output voltage. The baseband signal selected by switch 6 is amplified by a baseband amplifier 7 and then used to drive an output speaker 8. In sum, this prior art twin receiver system automatically switches to the stronger of two recovered signals in response to a comparator circuit's indication as to which receiver has the larger wave envelope detector output voltage.

However, such a prior art diversity receiver does not perform well when the electromagnetic signals picked up by each of the two antennas are relatively weak with a high content of background noise. In such a case, the envelope detector signals are correspondingly noisy. Thus, even if the inputs to the two receivers are about the same quality, the noise can cause unnecessary automatic switching between the receivers. The noise generated by this unnecessary switching further weakens the signal-to-noise ratio (S/N) of the recovered signal.

Moreover, there are also problems when the signals picked up by both antennas are relatively strong. In such a case, even a significant drop in wave amplitude may not cause much degradation in an already good S/N. However, the prior art circuit continues to automatically search for and switch to the stronger signal, giving rise to more switching than needed. This causes additional "switching noise" that degrades the recovered signal, leading to an undesirable saturation of S/N for strong signals (see FIG. 4).

FIG. 1 shows a block diagram of a first embodiment of my invention providing a diversity receiver which is suitable for FM signals. The FM modulated signals are picked up by a pair of antennas 1 and 2 which are separated from each other. The signals are respectively input to a pair of demodulating receivers 3 and 4, which in turn recover baseband signals S1 and S2 from them. The recovered baseband signals S1 and S2 are input to baseband switch 6, which selects one of them to be fed via base-band amplifier 7 to output speaker 8.

Each receiver includes a wave envelope detector WD for detecting the wave envelope of the antenna signals which it receives, and hence for detecting their signal strength. These wave envelope detectors respectively generate detector output voltages $v_1$ (receiver 3) and $v_2$ (receiver 4), which voltages are proportional to the strengths of the electromagnetic waves input from their respective antennas 1, 2.

A dotted line 70 encloses parts constituting an improved comparator portion of the invention. A comaparator 5 in a comparator circuit 15 receives the envelope detector voltages $v_1$ and $v_2$ and simultaneously sends switching control signals to both baseband switch 6 and signal switch 9.

The detector output voltages $v_1$, $v_2$ of receivers 3 and 4 are also split off as alternative inputs to signal switch 9. The output selected by switch 9 goes to an integrator or low pass filter 10, which smoothes or time-averages the selected detector output voltage. The output of integrator 10 is an input to controller 11, which generates a control signal that is an additional input to comparator 5 in order to give it a predetermined amount of hysteresis or a threshold resistance to cahnge, that is responsive to the smoothed wave envelope detector output voltage produced by integrator 10.

The first embodiment operates this way. As shown in FIG. 1, the circuit is such that every time comparator 5 sends a control signal to reverse the position of baseband switch 6, it also simultaneously sens a corresponding control signal to reverse signal switch 9. For example, if comparator 5 orders baseband switch 6 to select receiver 3, as having the stronger received signal, it also simultaneously orders signal switch 9 to select the detector output voltage $v_1$ to be fed to integrator 10.

Conversely, if switch 6 is ordered to select receiver 4, output voltage $v_2$ is fed to integrator 10. Integrator 10 then produces a smoothed output signal that is a time-averaged version of which ever detector output voltage is then being received by it and feeds such smoothed signal to controller 11. This smoothed signal reflects the strength of the signal waves. Controller 11, in turn, generates a control signal for comparator 5 that causes it to make a corresponding change in the amount of its hysteresis or threshold resistance to change, depending on the strength of the received signal.

For weak signal waves, FIG. 2 shows typical wave envelope detector output voltages which vary as a function of time. These output voltages are from the two receivers used in the embodiment of FIG. 1, together with a trace indicating which receiver output will be selected by comparator 5.

Starting on the left of FIG. 2, initially $v_1$ is greater than $v_2$, so receiver 3 is selected. However, because of the hysteresis or threshold resistance to change which is set in comparator 5, that comparator will not order a switchover to receiver 4 until after the detector voltage $v_1$ falls below detector voltage $v_2$ by some specific amount d. If the amount of hysteresis or threshold resistance to change d is larger than the typical noise voltage that appears in the detector outputs, unnecessary switching between the receivers can be virtually eliminated.

For strong signal waves, FIG. 3 shows typical wave envelope detector output voltages which vary as a function of time. These two voltages are provided by the two receivers used in the embodiment of FIG. 1. FIG. 3 also includes a trace indicating which receiver output is selected by comparator 5. Because the threshold resistance to change d' in comparator 5 has been set much larger than it was set in FIG. 2, there will be no switchover of receivers unless the difference in detector output voltages becomes unusually large. Therefore, compared with the situation for weak signals, the frequency of switching has greatly diminished.

Figure 4:
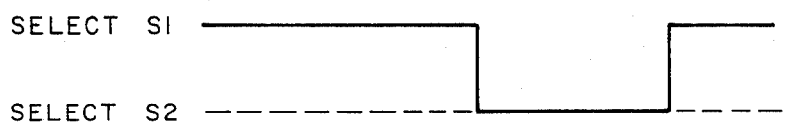
FIG. 4 shows a graph of the noise level of the embodiment of FIG. 1 as a function of the average signal strength of the received electromagnetic waves, together with a comparison of the noise level of a prior art receiver shown in FIG. 7.
Figure 4:
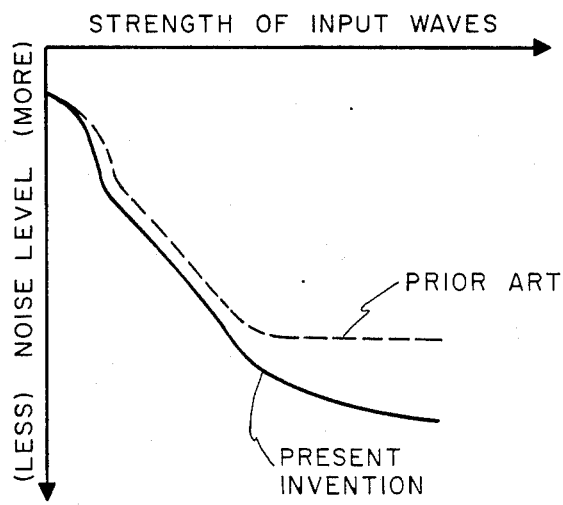

FIG. 4 shows a graph of the noise level of the embodiment of FIG. 1 as a function of the average signal strength of the received electromagnetic waves, together with a comparison of the noise level of the prior art receiver of FIG. 7 (dotted line). From this graph, it is clear that the introduction of a controlled amount of hysteresis or threshold resistance to change generally reduces the noise, particularly for strong signal waves.

Figure 5:
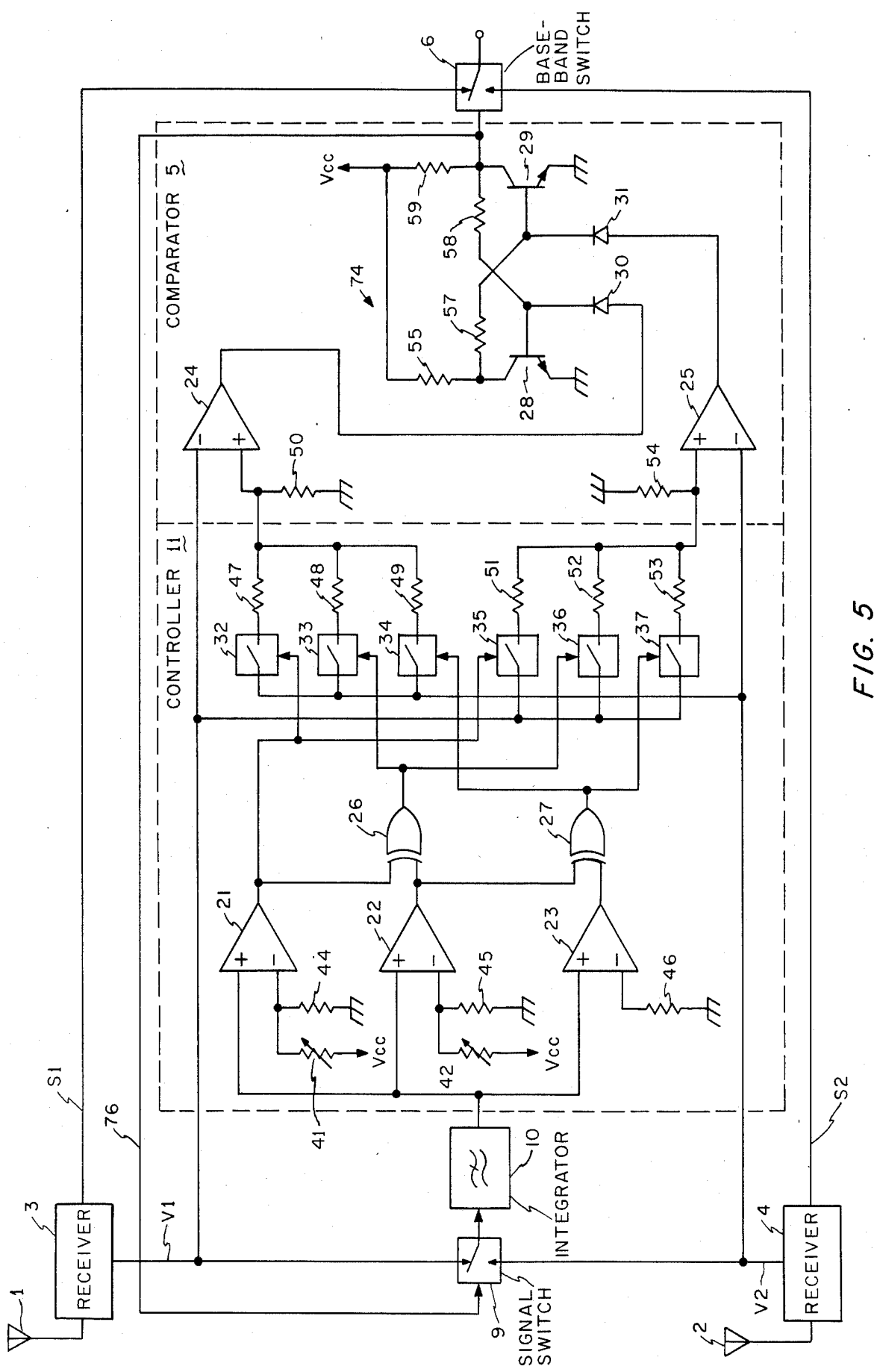
FIG. 5 is a simplified diagrammatic schematic of the embodiment of FIG. 1, showing details of the controller and comparator.

FIG. 5 is a simplified diagrammatic schematic of the embodiment of FIG. 1, showing details of the controller and comparator. FM receivers 3 and 4 recover the modulated signals picked up by antennas 1 and 2 and deliver them as baseband signals S1 and S2 that become the alternative inputs to baseband switch 6. To help determine which signal is better, the respective wave envelope detector output voltages $v_1$, $v_2$ from receivers 3 and 4 are input as alternatives to signal switch 9.

FIG. 5 shows the case where receiver 3 has been selected and the detector output voltage $v_1$ has been input to a low pass smoothing filter 10. The output of low pass filter 10 is being input to the "+" side of comparators 21, 22, & 23.

Comparators 21–23 and their associated logic network are for determining when the signal waves are "weak", "mid-strength", and "strong". The "−" inputs of comparators 21 and 22 are provided with reference voltages obtained by voltage dividers respectively formed by potentiometers 41, 42 and resistors 44, 45 connected between a supply voltage $v_{cc}$ and ground. The potentiometers are set to adjust for the characteristics of the particular wave detectors (not shown) that produce the detector output voltages. The "−" input of comparator 23 is grounded by resistor 46.

The reference voltage input to comparator 21 is set higher than the reference voltage input to comparator 22. For example, suppose comparator 21 is set for a received detector output voltage of 20 dB microvolts and comparator 22 is set for 10 dB microvolts. Further suppose the voltage input from low pass filter 10 is 20 dB microvolts or more, indicating a "stong" signal wave. Then the outputs of all three comparators 21-23 will become logical 1's. This will cause the outputs of Exclusive OR gates 26 and 27 to become 0's. A logic network at the inputs of a set of controllable switches 32–37 is arranged so that when both gates 26 and 27 output 0's, only switches 32 and 35 will be "CLOSED", the others being left "OPEN".

Suppose that the voltage input from low pass filter 10 is between 10 dB-20 dB microvolts, indicating a "mid-strength" signal wave. The comparator 21 gives an output which is a 0, but comparators 22 and 23 continue giving outputs which are 1's. This causes Exclusive OR gate 26 to give an outut which is a 1, but Exclusive OR 27 continues to output a 0. For the logic network which is shown, the outputs of the gates cause only switches 33 and 36 to be fed control input signals of 1, thus switching them "CLOSED" and leaving the others "OPEN".

When the voltage input from low pass filter 10 equals or falls below 10 dB microvolts, it indicates a "weak" signal wave. Comparators 21 and 22 then give outputs which are 0's, while only comparator 23 will continue to give an output which is a 1. Therefore, Exclusive OR 26 gives an output which is a 0 and Exclusive OR 27 given an output which is a 1. This causes only switches 34 and 37 to be "CLOSED", the other being left "OPEN".

The responses of the logical network described above are summarized by Table I.

TABLE I

| RESPONSE OF LOGIC NETWORK | | | |
|---|---|---|---|
| | SIGNAL WAVE STRENGTH | | |
| | WEAK | MID-STRENGTH | STRONG |
| GATE OUTPUT | | | |

TABLE I-continued

| | RESPONSE OF LOGIC NETWORK SIGNAL WAVE STRENGTH | | |
|---|---|---|---|
| | WEAK | MID-STRENGTH | STRONG |
| 21 | 0 | 0 | 1 |
| 22 | 0 | 1 | 1 |
| 23 | 1 | 1 | 1 |
| 26 | 0 | 1 | 0 |
| 27 | 1 | 0 | 0 |
| SWITCH POSITION | | | |
| 32 | OPEN | OPEN | CLOSED |
| 33 | OPEN | CLOSED | OPEN |
| 34 | CLOSED | OPEN | OPEN |
| 35 | OPEN | OPEN | CLOSED |
| 36 | OPEN | CLOSED | OPEN |
| 37 | CLOSED | OPEN | OPEN |

In FIG. 5, comparator circuit 5 is shown as including two comparators 24 and 25 having "−" inputs respectively receiving wave envelope detector output voltages $v_1$ and $v_2$. The "+" inputs of comparators 24 and 25 receive the corresponding "other" wave envelope detector output voltage $v_2$ or $v_1$, as proportionally reduced by the voltage divider networks leading to these "+" inputs. Thus, comparator circuit 5 is called a "hysteresis comparator".

One end of each of the resistors 50 and 54 is respectively connected to the "+" input of comparators 24 and 25, and the other end of each resistor is connected to ground. Controllable switches 32–37 effectively switch resistors 47–49 and 51–53 into and out of the voltage divider circuits connected to the "+" inputs of comparators 24 and 25. Thus, switches 32–37 set the relative values of the resistors making up the voltage dividers connected to the "+" inputs, thereby adjusting the amount of hysteresis that is exhibited by comparators 24 and 25.

To enable the hysteresis operation described above, resistors 47–49 and 51–53 should preferably have the following relationships:

resistor 47 > resistor 48 > resistor 49
resistor 51 > resistor 52 > resistor 53

The output of comparators 24 and 25 is input through respective input diodes 30 and 31 to a bistable multivibrator 74. For example, suppose receiver 3 is selected by swtiches 6 and 9 because $v_1 > v_2$ by an amount exceeding the current hysteresis or threshold resistance to change. This means that comparator 24 is producing a "0" and comparator 25 is producing a "1". Bistable 74 then has its left transistor 28 "OFF" and its right transistor 29 "ON", which can be interpreted as outputting a logical "0" to the control input of switch 6 which selects the recovered signal S1.

Next, suppose that wave envelope detector output voltage $v_1$ becomes less than detector output voltage $v_2$, by an amount exceeding the current hysteresis or the threshold resistance to change. Comparator 24 switches from "0" to "1", causing a positive pulse to pass through diode 30 to the base of the bistable's transistor 28, flipping bistable 74 so that left transistor 28 becomes "ON" and right transistor 29 becomes "OFF". Bistable 74 then has an output which is a logical "1" and which controls switch 6 to select recovered signal S1 from receiver 4. This output of bistable 74 also controls switch 9, via line 76, to select detector output voltage $v_2$ as input for integrator 10.

FIG. 6 is a simplified diagrammatic block diagram of a second embodiment of the invention employing a digital controller. It has a comparator circuit 16 which includes an analog-to-digital converter 12, a digital controller 13, and a digital-to-analog converter 14. The digital controller 13 could be, for example, a microprocessor based controller.

The first embodiment of FIG. 5 quantizes the strength of the signal waves into three levels: weak, mid-strength, and strong. It also quantizes the amount of hysteresis into three alternatives. The second embodiment of FIG. 6 provides virtually a continuum of hysteresis adjustments, by means such as a computation or table look up by the digital controller; thus, such a continuum of adjustments is within the scope of the invention.

As will now be apparent, my invention uses a comparator that has hysteresis for providing the output signals responsive to the wave envelope detectors. The amount of hysteresis is adjusted in response the the strength of the received signal waves. This substantially reduces the frequency of switching between the alternative recovered signals, greatly reducing the noise which is introduced into the recovered signal by the switching between receivers, both when the signals are weak and when they are strong.

While the principles of the invention have been described above in connection with specific apparatus and applications, it is to be understood that this description is made only by way of example and not as a limitation on the scope of the invention.

The invention claimed is:

1. A diversity reception radio receiver having:
   a two-receiver system having first and second receivers for responding to electromagnetic signal waves;
   wave envelope detector means associated with each receiver for generrting an output voltage corresponding to the strength of an electromagnetic signal wave picked up by its associated receiver;
   hysteresis comparator means for comparing the outputs of the two wave envelope detectors and for generating a switching control signal in response thereto, said hysteresis comparator means changing a threshold level of change in response to the strength of one of the outputs of the two wave envelope detectors; and
   switching means responsive to the switching control signal for selecting between first and second recovered signals respectively produced by the first and second receivers, whereby switching between said first and second recovered signals occurs only after the compared outputs reach said threshold level of change.

2. A diversity radio receiver system comprising:
   first and second reception channels extending to output means, each of said channels comprising at least a receiver and an individually associated antenna;
   comparator means for comparing the strength of received signals in said two channels, said comparator means having a threshold level of resistance to chaange and changing said threshold level in response to the strength of one of the received signals; and
   first switching means responsive to said compared signals reaching said threshold level for selecting the channel having the stronger signal and for applying the output of said selected channel to said output means.

3. The diversity receiver of claim 2 and wave envelope detector means associated with each of said channels for generating an output voltage which is representative of the strength of signals in the respective channels.

4. The diversity receiver of claim 3 and signal switching means for selectively applying signals from either one of said receivers to a control input of said comparator, and means for simultaneously applying switching control signals from said comparator means to both said first and said signal switching means.

5. The diversity receiver of claim 4 and integrator means coupled to smooth signals passing through said signal switching means to provide an average voltage which is representative of the strength of said signal.

6. The diversity receiver of claim 5 and logic circuit means responsive to said inegrator means for measuring the level of signals in order to generate the threshold level for said comparator means.

7. The diversity receiver of claim 5 and means responsive to said integrator means for converting said received signals into digital signals, and means responsive to said digital signals for controlling said signal switching means.

8. A diversity radio receiver system comprising:
first and second reception channels extending to output means, each of said channels comprising at least a receiver and an individually associated antenna;
wave envelope detector means associated with each of said channels for generating an output voltage which is representative of the strength of signals in the respective channels;
comparator means for comparing the strength of received signals in said two channels, said comparator means having a threshold level of resistance to change;
first switching means responsive to said compared signals reaching said threshold level for selecting the channel having the stronger signal and for applying the output of said selected channel to said output means;
signal switching means for selectively applying signals from either one of said receivers to a control input of said comparator; and
means for simultaneously applying switching control signals from said comparator means to both said first and said signal switching means.

9. The diversity receiver of claim 8 and integrator means coupled to smooth signals passing through said signal switching means to provide an average voltage which is representative of the strength of said signal.

10. The diversity receiver of claim 9 and logic circuit means responsive to said integrator means for measuring the level of signals in order to generate the threshold level for said comparator means.

11. The diverstiry receiver of claim 9 and means responsive to said integrator means for converting said received signals into digital signals, and means responsive to said digital signals for controlling said signal switching means.

12. A method of selecting a stronger of two wave signals received at a diversity receiver, said method comprising the steps of:
(a) envelope detecting each of the two wave signals;
(b) comparing the signals detected in step (a) to find the stronger of said two signals and preventng a response to said comparison for a hysteresis amount;
(c) changing said hysteresis amount in response to the strength of one of the signals detected in step (a); and
(d) switching to the stronger of said two signals after said hysteresis amount is exceeded following a detection of a change in the relative signal strength of said two signals.

* * * * *